United States Patent [19]

Takeda

[11] Patent Number: 5,041,819

[45] Date of Patent: Aug. 20, 1991

[54] DATA PROCESSING DEVICE

[75] Inventor: Susumu Takeda, Kasugai, Japan

[73] Assignee: Brother Kogyo Kabushiki Kaisha, Nagoya, Japan

[21] Appl. No.: 424,345

[22] Filed: Oct. 18, 1989

[30] Foreign Application Priority Data

Oct. 19, 1988 [JP] Japan ................. 63-263594

[51] Int. Cl.⁵ .............................................. A09G 3/02
[52] U.S. Cl. ................................. 340/709; 340/711; 340/706; 400/477
[58] Field of Search ............ 340/711, 709, 112, 706; 400/477, 479, 485, 472; 341/23, 22

[56] References Cited

U.S. PATENT DOCUMENTS

| | | | |
|---|---|---|---|
| 4,575,591 | 3/1986 | Lugaresi | 340/709 |
| 4,633,227 | 12/1986 | Menn | 340/711 |
| 4,680,577 | 7/1987 | Straayer et al. | 340/709 |
| 4,803,474 | 2/1989 | Kulp | 340/711 |

Primary Examiner—Alvin E. Oberley
Assistant Examiner—Xiao M. Wu
Attorney, Agent, or Firm—Kane, Dalsimer, Sullivan, Kurucz, Levy, Eisele and Richard

[57] ABSTRACT

In a data processing device having a display and a keyboard, a cursor on the display is moved with each of input keys on the keyboard in a predetermined processing mode designated by a mode change key. There are two ways for determining the directions to which the cursor is moved. One is that the directions is determined in accordance with a positinal relationship between two keys successively operated. The other is that the directions is determined in accordance with a positional relationship between the operated key and a reference key determined in advance. Thus, each of keys for respectively inputting codes are utilized as cursor movement keys.

20 Claims, 11 Drawing Sheets

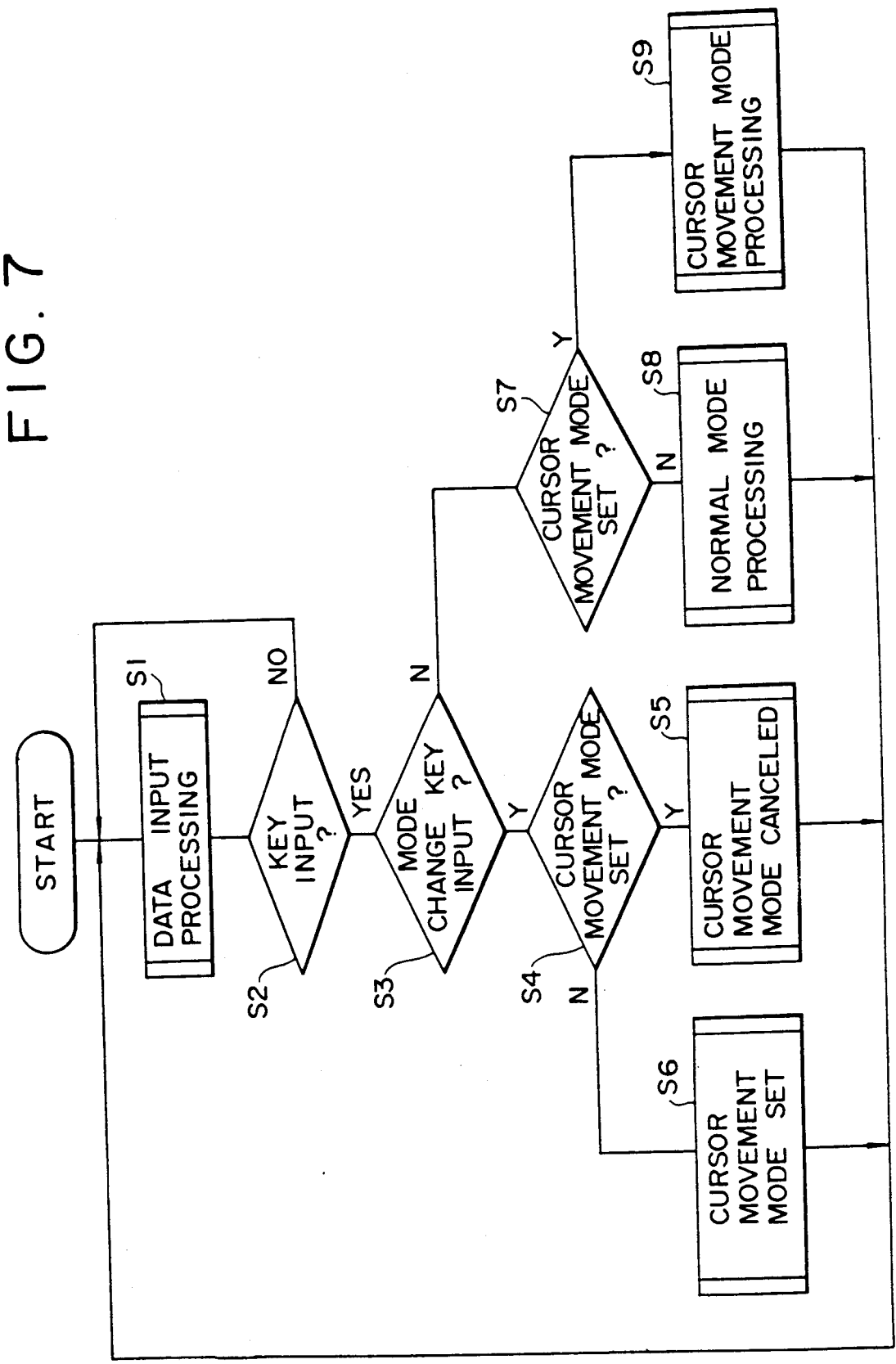

| FIG.8(B) | FIG.8(A) |

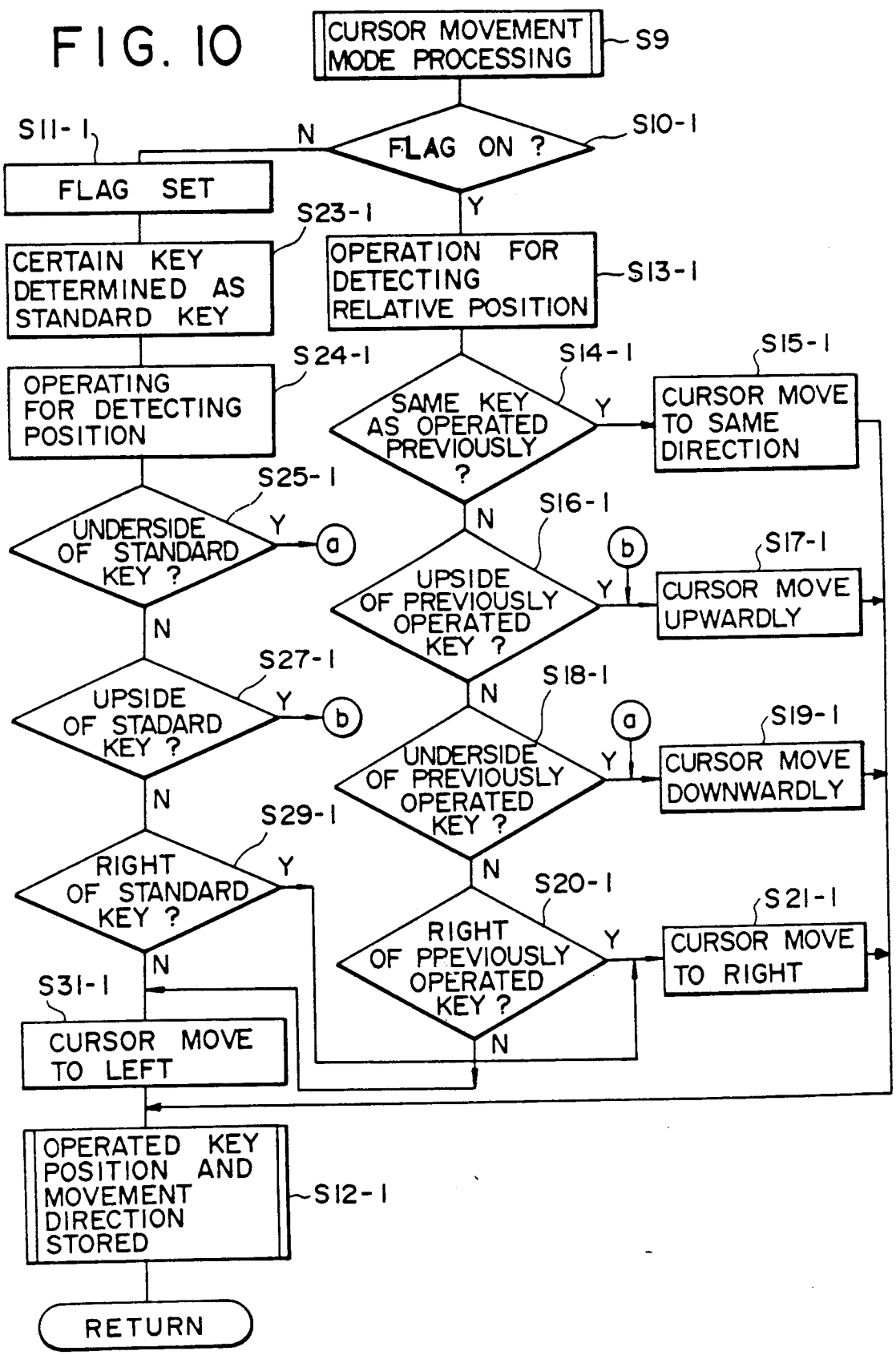

DATA PROCESSING DEVICE

BACKGROUND OF THE INVENTION

This invention relates to a data processing device, and more particularly to a device having a movement control function of a cursor on a display.

There has been provided on a keyboard of a data processing device, besides character keys which input alphanumerical codes, cursor movement keys separately from them for moving the cursor to the desired direction on the display. The cursor movement keys are provided respectively for the directions to which the cursor moves, generally, one key for one of four directions, i.e., right, left, upside and underside. The cursor movement keys are arranged corresponding to the cursor movement direction, and placed on a separate area from the character keys on the keyboard.

Since cursor movement keys are placed on different section from the character keys on the keyboard, so there exists a problem that the number of the keys on the keyboard increases and the size of the keyboard is enlarged. Moreover, in view of operability of the keyboard, if an operator wants to move the cursor during normal operation of inputting character codes and symbol codes, the operator has to stop operating keys for code inputting, and then, operate the cursor keys in the separate area. It is also necessary for the operator to put eyes off the display and move hands to the cursor movement keys, so there exists a problem that the operation is troublesome.

On the contrary, if the cursor movement keys are arranged as parts of a lot of character keys, it becomes a problem that mal-operation of the key occurs because arranged around the cursor movement keys are the keys which are not the cursor movement keys.

SUMMARY OF THE INVENTION

It is therefore an object of the invention to provide an improved data processing device capable of moving the cursor to the desired direction on the display without the above deficiencies.

For this purpose, according to this invention, there is provided a data processing device comprising input means including a plurality of key members, respectively corresponding to a code to be inputted, represent means for representing character data corresponding to the inputted codes, and designate means for designating a position at which a code to be inputted on the represent means, the data processing device further comprising: mode change means for changing an operation mode of the data processing device between a normal input mode and at least an another predetermined mode; first examine means for examining whether the another predetermined mode is designated by the mode change means when one of the key members is operated; and control means for controlling each of the key members, in case that the another predetermined mode is designated, so as to have a predetermined relationship with the designate means in accordance with each of positional relationships between the one of the key members and each of the key members on the input means.

DESCRIPTION OF THE ACCOMPANYING DRAWINGS

FIG. 7 is a main flow chart showing an operation of the data processing device of FIG. 1;

Figure 8A:
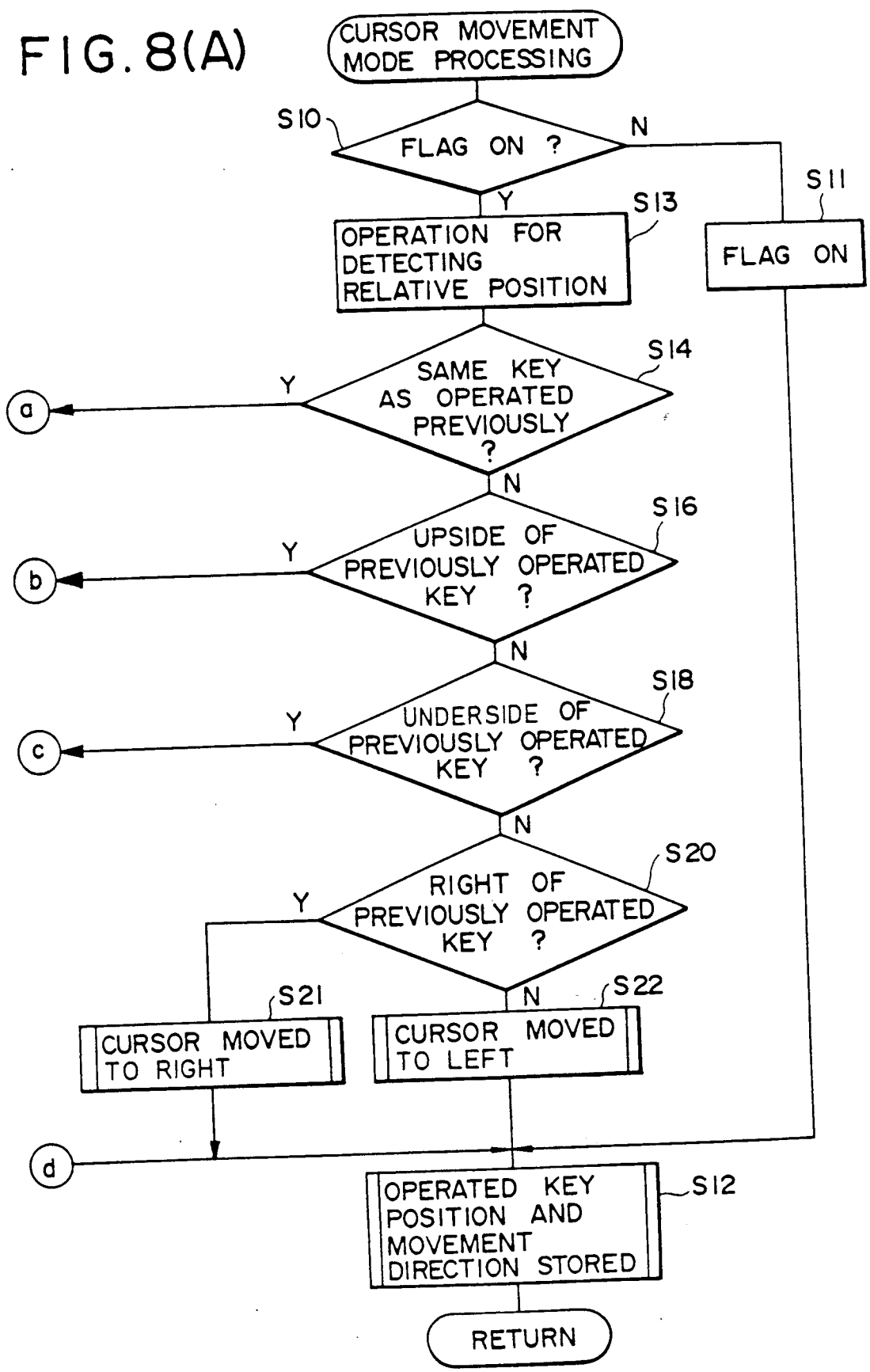
Figure 8B:
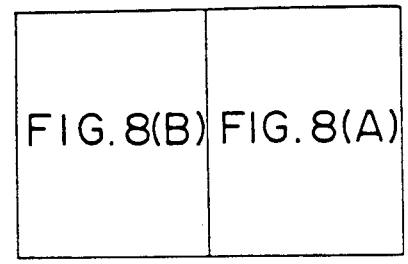
Figure 9:
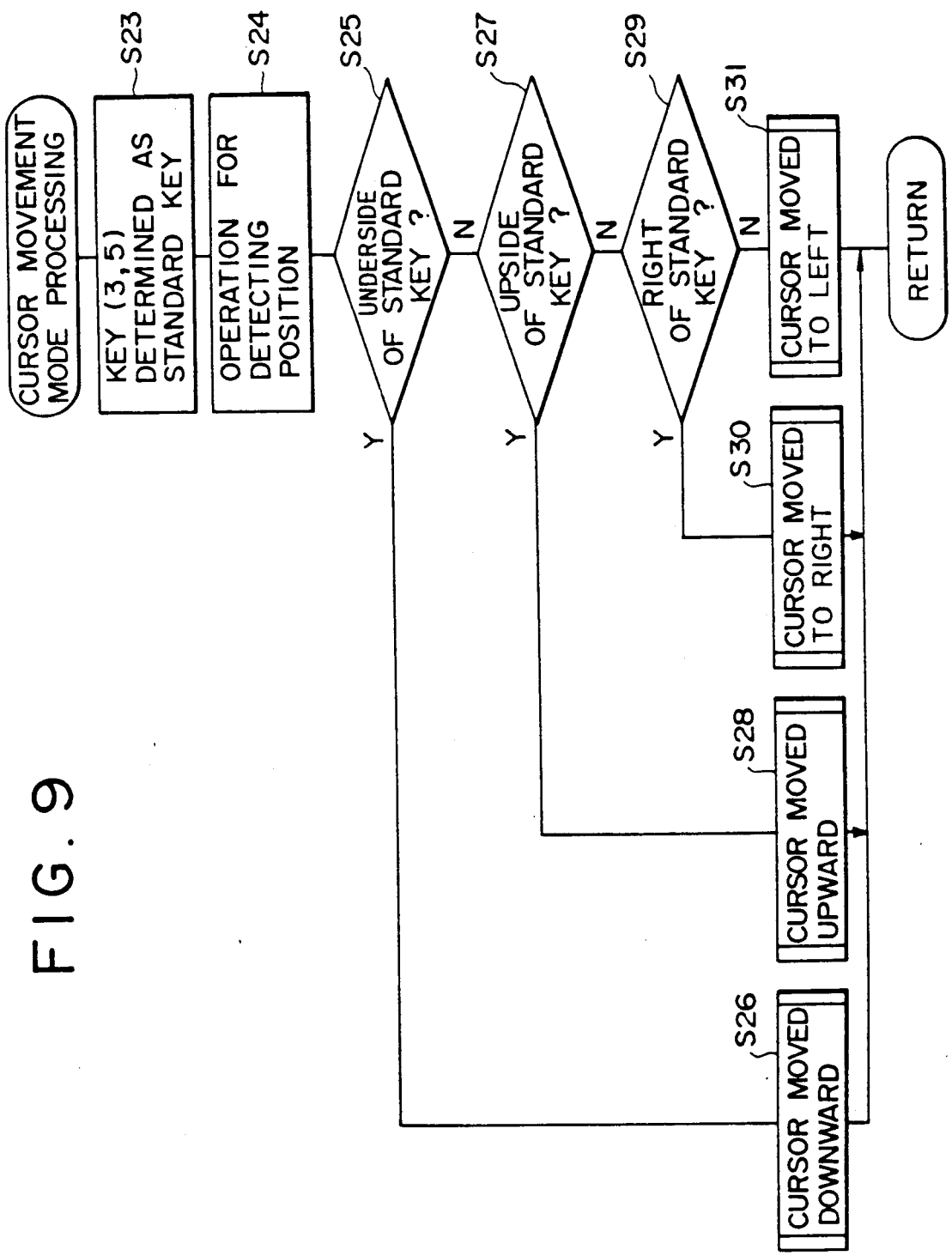

FIGS. 8(A) and 8(B) are a subroutine of cursor movement mode procedure relating to one embodiment of the present invention;

FIG. 9 is a subroutine of cursor movement mode procedure relating to an another embodiment of the present invention; and FIG. 10 is a subroutine of cursor movement mode procedure relating to a still another embodiment of the present invention.

DESCRIPTION OF THE EMBODIMENTS

Figure 1:
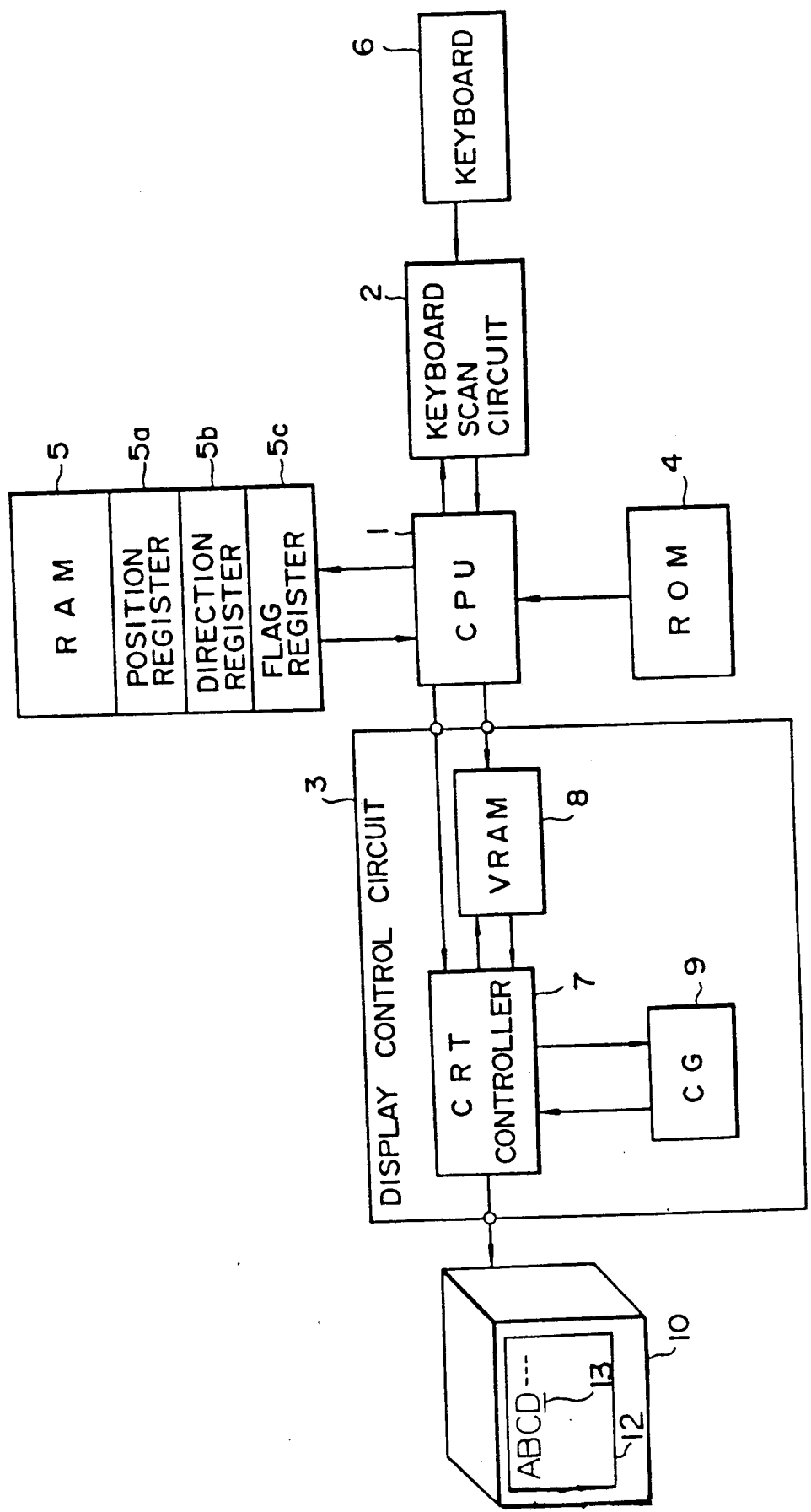
FIG. 1 shows a block diagram of a data processing device embodying the present invention.

FIG. 1 is a block diagram of a data processing device embodying the present invention. A CPU (Central Processing Unit) 1 is electrically connected with a keyboard scan circuit 2, with a display control circuit 3, and with a ROM (Read Only Memory) 4 and a RAM (Random Access Memory) 5. The ROM 4 and the RAM 5 are memory for storing data or program. A CRT (Cathode Ray Tube) display unit 10 is elctrically connected through a CRT controller 7 to the CPU 1. A cursor for indicating a position at which a code is to be inputted is represented on a display screen 12 of the CRT display unit 10. The keyboard scan circuit 2 is electrically connected with a keyboard 6 on which a plurality of keys 6a are provided, this keyboard scan circuit 2 detects the position of the operated key on the keyboard 6 and outputs the positional data to the CPU 1. The program which controls the procedure of CPU 1 is stored in the ROM 4. The RAM 5 comprises a position register 5a where the positional data of a key 6a sent from the keyboard scan circuit 2 to the CPU 1 are stored, and it also comprises a direction register 5b at which the data of a direction to which a cursor 13 is moved with the key operation is stored, and comprises a flag register 5c where the flag with which it is examined whether the key 6a is operated primarily in a cursor movement mode, described below, or not is stored.

A display control circuit 3 comprises the CRT controller 7, a video RAM 8, and a CG (Character Generator) 9. The CRT controller 7 and the video RAM 8 electrically connected with the CPU 1, and to the CRT controller 7, the video RAM 8, the CG 9 and the CRT display unit 10 are electrically connected. On the display control circuit 3 constructed as above, the CPU 1 outputs to the video RAM 8 the address signal indicating the memory address of a dot pattern of the display character stored in the CG 9. Then the CRT controller 7 reads out the dot pattern data from the CG 9 depending on the address signal stored in the video RAM 8, and outputs it to the CRT display unit 10. Moreover, the CPU 1 outputs the display positional data which sets up the display position on the CRT display unit 10 to the CRT controller 7 depending on the program stored in RAM 4. The CRT controller 7 outputs the dot pattern data onto the location on the display indicated by display positional data.

Figure 2:
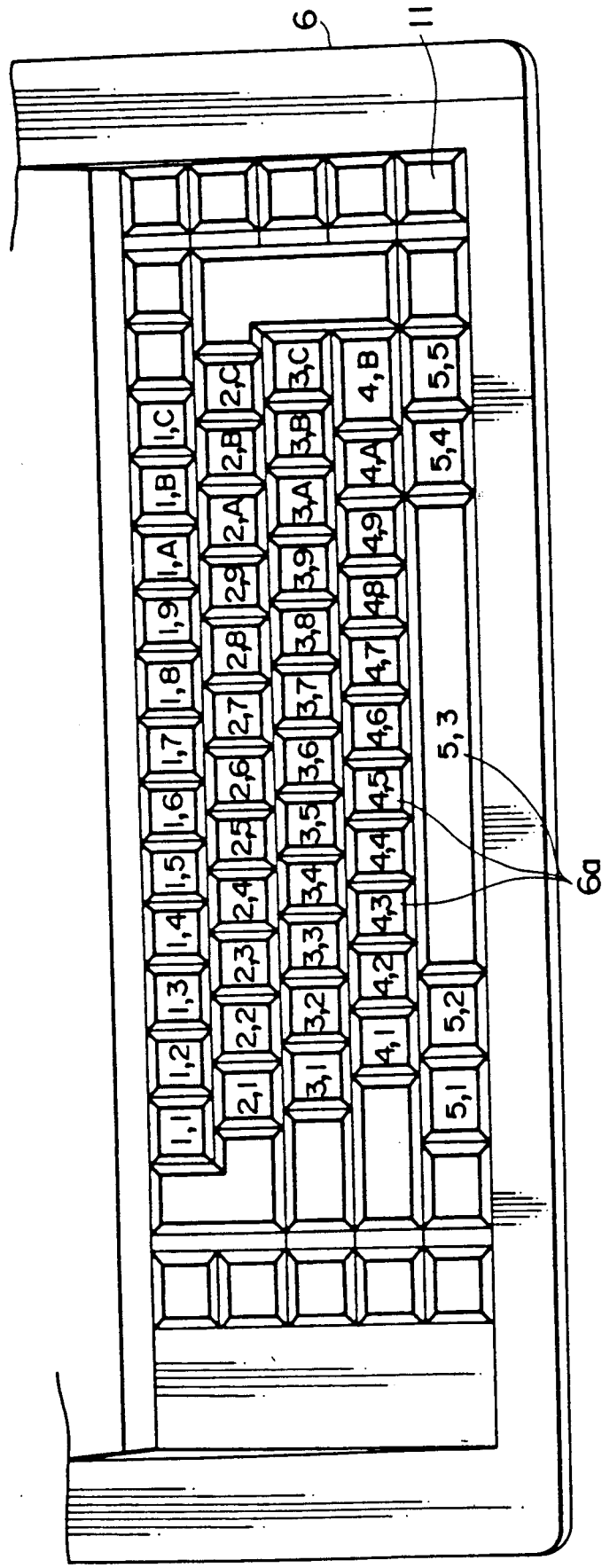
FIGS. 2 through 6 are illustrative views showing the relation of the arrangement of input keys on the keyboard embodying the invention to a cursor movement direction with use of these keys.
Figure 3:
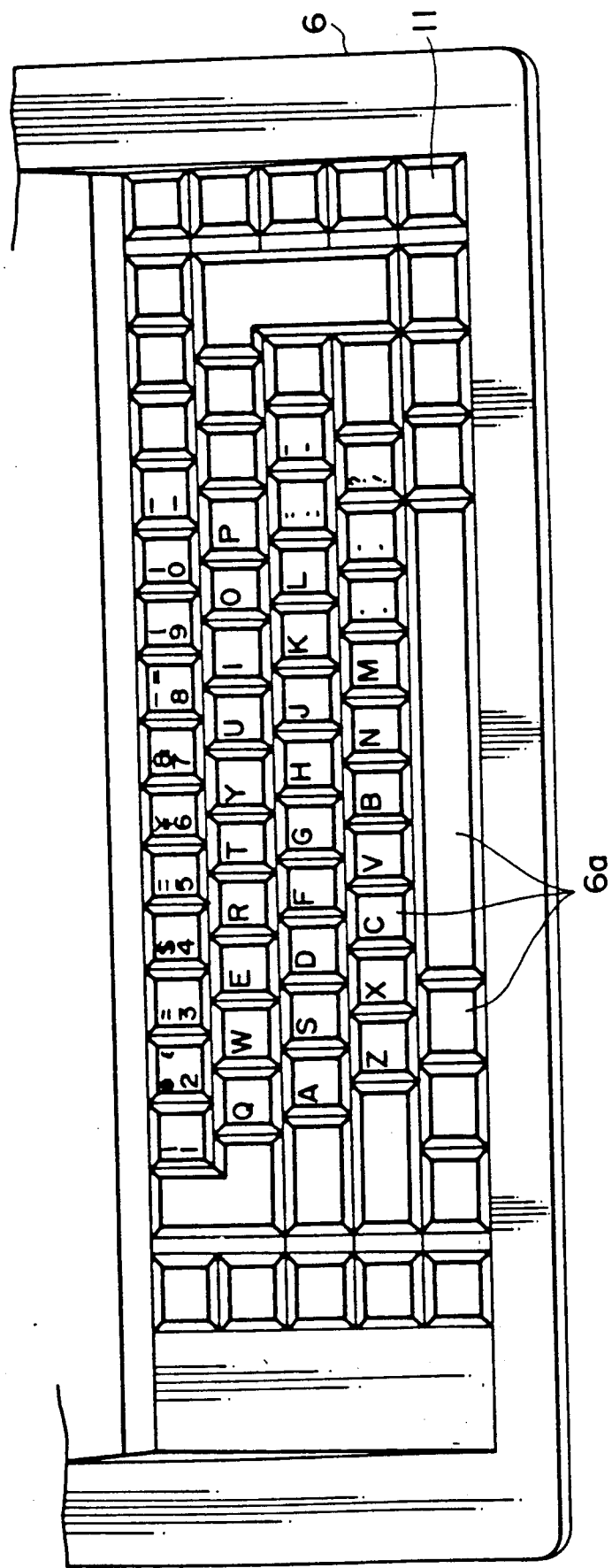

In the present embodiment, the keyboard 6, as shown in FIG. 2, includes a plurality of keys 6a arranged along a plurality of rows and columns, and to each of the keys 6a, values which indicates the position on the keyboard 6 are given to identify the position on the keyboard 6; by that values, the position of the pressed key 6a can be identified. These values are called position numbers. A set of values (value in the column direction:m, value in the row direction:n) represent a set of position numbers of each key. For instance, if a key 6a is pressed in a normal mode, where characters or symbols are inputted through keys on the keyboard 6, the position of the pressed key 6a on the keyboard 6 is detected by the keyboard scan circuit 2. The CPU 1, depending on the positional data from the keyboard scan circuit 2, reads out the character code from a particular code table corresponding to the pressed key 6a and outputs it to the display control circuit 3.

Figure 4:
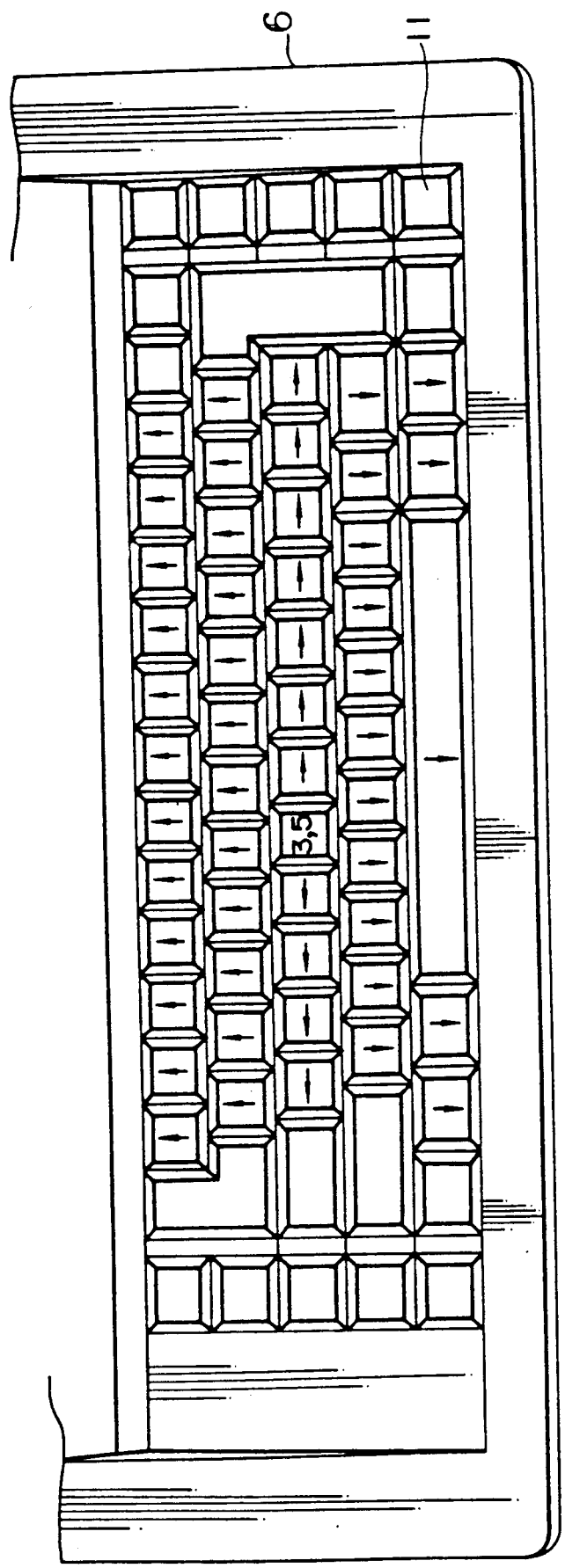

In the cursor movement mode in which one of the keys 6a on the keyboard 6 are operated as keys for moving the cursor 13, as shown in FIG. 4, the relative position of the keys 6a as well as the key position on the keyboard 6 can be identified by this set of position numbers. This identification of the relative position is executed by comparing the set of position numbers of the previously depressed key 6a which is stored in the position register 5a of RAM 5 with that of the key 6a successively depressed. This comparison is executed by a following equation:

$$P - S$$

where,
P: the set of position numbers of previously depressed key,
S: the set of position numbers of successively depressed key,
both in the row and the column direction; the result of this operation is classified by the value of the operation result: positive, negative or zero.

Figure 6:
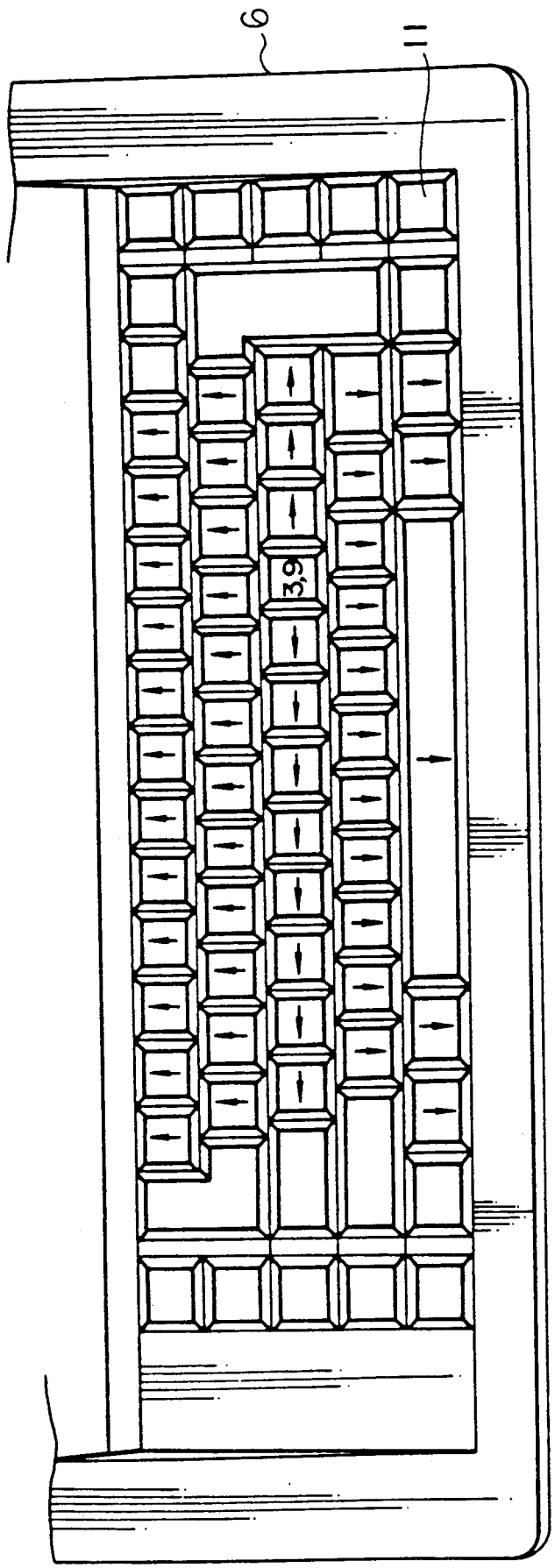

For example, comparing the position (3,5) in FIG. 4 with the position (3,9) in FIG. 6, the operation result is zero in the column direction, so it is determined that the keys depressed previously and successively are on the same row. While the operation result is negative in the row direction, so it is determined that the successively depressed key is on the right side of the previously depressed key. In other words, if the operation result is positive, it is determined that the position is upward in the column direction or left in the row direction. If the operation result is zero, the key is determined to be on the same position both in the row and the column direction. In this embodiment, however, the operation result in the column direction has a priority, and only when the successively depressed key 6a is on the same line of the previously depressed key 6a, the cursor is moved to right or to left depending on the operation results.

On the keyboard 6, there is provided a mode change key 11, which is used to change the function mode of the keys between the normal mode and the cursor movement mode.

Next, the procedure of the of the data processing device will be explained referring to FIGS. 7 and 8.

To begin with, the mode change between the normal mode and the cursor movement mode illustrated in FIG. 7 is explained. In the procedure of the step S1 and step S2, it is examined whether a key 6a on the keyboard 6 is depressed or not, and these steps are repeated until a key is depressed; when the key is determined to be depressed, the procedure goes to step S3. In step S3, it is further examined whether the depressed key 6a is the mode change key 11 or not; if the key is determined to be the mode change key 11, it is examined whether the present mode is the cursor movement mode or not in step S4.

If the procedure is determined to be in the cursor movement mode, the mode is canceled and changed into the normal mode in step S5; the flag register 5c of RAM 5 is reset, the procedure returns to step S1. If it is determined that the procedure is not in the cursor movement mode in step S4, the procedure is changed into the cursor movement mode in step S6, the flag register 5c of RAM 5 is set, the procedure returns to step S1. In step S3, if the mode change key 11 is determined not to be depressed, it is examined whether the present mode is the cursor movement mode or not in step S7. If it is determined that the present mode is not the cursor movement mode in this step, a predetermined procedure corresponding to the depressed key is executed in step S8 in the normal mode and the procedure returns to step S1.

If the present mode is determined to be the cursor movement mode in step S7, the procedure goes to step S9, each of the keys 6a on the keyboard 6 performs as a cursor movement key with which the cursor 13 is moved to the direction indicated by an arrow on it in FIG. 4.

Next, the procedure of the cursor movement mode procedure, which shows the first embodiment, corresponding to the procedure in step S9 described above will be explained referring to FIG. 7.

In the procedure immediately after changed into the cursor movement mode, for example, if the key 6a corresponding to the position (3,5) shown in FIG. 2 is depressed at first, it is examined in step S10 whether the key 6a is pressed or not in the cursor movement mode before the succeeding key operation, namely, the CPU 1 examines whether flag register 5c of RAM 5 is set or not. In this case, the flag register 5c is determined to be reset, the procedure goes to step S11, the flag register 5c of RAM 5 is set, the position (3,5) of the key 6a is stored in the position register 5a on RAM 5, and the procedure returns to step S1. Hereupon, each of keys 6a on the keyboard 6 performs as a cursor movement key with which the cursor 13 is moved to the direction indicated by an arrow on it in FIG. 4

If the key 6a which position is (2,4) in FIG. 2 is depressed, as the flag register 5c of RAM 5 is set, so the procedure is in the cursor movement mode, therefore it's not the first key operation after changed into cursor movement mode, and the procedure goes to step S13. In step S13, the operation is done to determine the relative position of the keys on the keyboard 6. The operation result is, as the position of the previously depressed key is (3,5) and the succeedingly depressed key is (2,4), so there is stored in the direction register 5b positive value in the column direction and positive value in the row direction. In the next step S14, it is examined whether the operation result received from the keyboard scan circuit 2 is zero or not in the row and the column direction, in other words, it is examined whether the previously depressed key is depressed again succeedingly or not.

In this example, the operation result is not zero either in the row or the column direction, so it is determined that the same key is not depressed, and the procedure goes to step S16.

In step S14, if it is determined that the succeedingly depressed key is the same key as depressed previously, the cursor 13 on the display is moved by one character/line in the same direction where it is moved at previous key operation, and the procedure goes to step S12.

Figure 5:
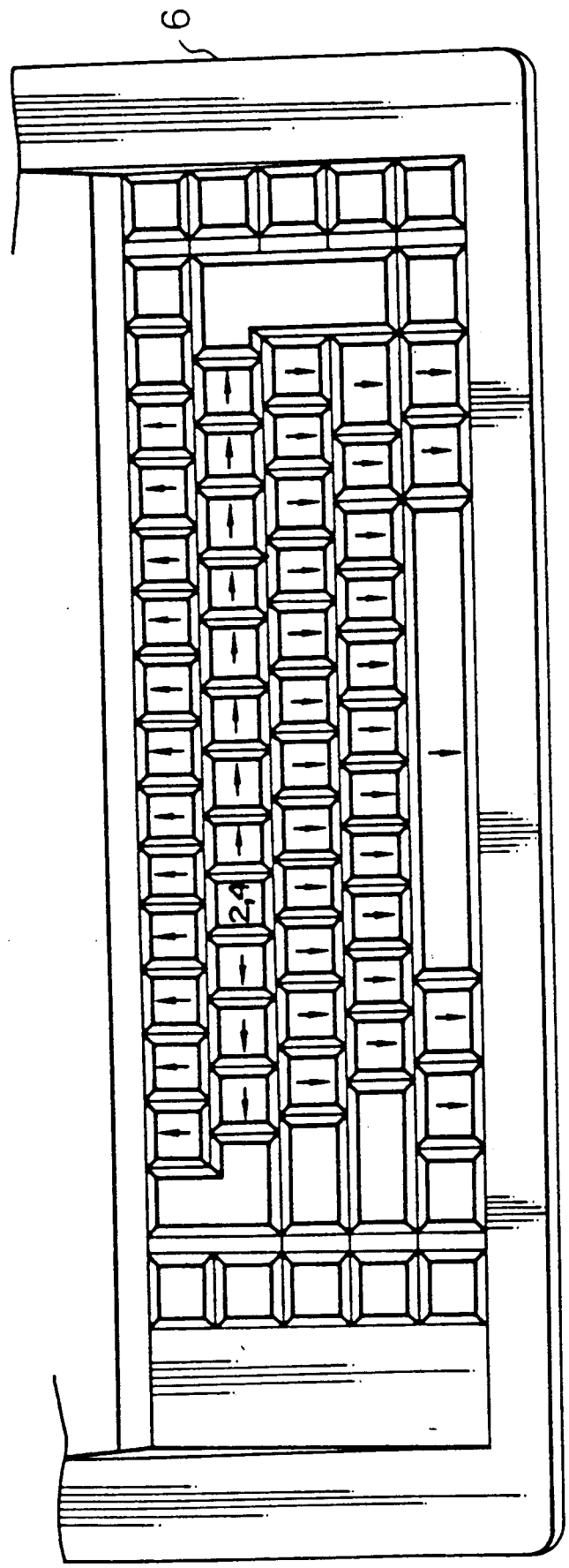

In step S16, it is examined based on the operation result in step S13 whether the depressed key is upside of the previously operated key or not, or whether the operation result in the row direction is positive or not. In this example, as the succeedingly operated key 6a is, comparing to previously pressed key, positive in the operation result in the column direction and determined that the succeedingly depressed key is upside of the previously pressed key. In the next step S17, the cursor 13 is moved upwardly by one line, and in step S12, the cursor movement direction of upside and the position (2,4) of the succeedingly depressed key are stored in the direction register 5b and the position register 5a respectively, and the procedure returns to step S1. At this time, each key 6a on the keyboard 6 performs as a cursor movement key with which the cursor 13 is moved to the direction indicated by an arrow on it in FIG. 5.

Next, if the key 6a which position is (2,9) in FIG. 2 is depressed, the procedure goes to step S16 similarly to the previous key operation. In step S16, the previous key position is (2,4) and succeeding position is (2,9) so the value in the row direction is zero according to the operation in step S13, and it is determined that succeedingly depressed key is not upside of the previously depressed key, then the procedure goes to step S18. In step S18, it is examined whether the succeedingly operated key is underside of the previously operated one or not, and it is examined whether the operation result in the column direction is negative or not. If the operation result is negative, or if it is determined that the key in the underside of the previously operated key is depressed, the cursor 13 is moved downwardly by one character in step S19 and the procedure goes to step S12.

In the example, however, as the operation result is zero in the column direction, therefore the relative position of the previously depressed key to the succeedingly depressed key is determined not to be in the underside, and the procedure goes to step S20. In step S20, it is examined whether the operation result in the row direction is negative or not and it is determined whether the key in the right side of the previously depressed key is depressed or not. As the operation result in step S13 is negative in the row direction, it is determined that the succeedingly depressed key is in the right side of the previously depressed key. In step S21, the cursor 13 is moved to the right by one character, then the procedure goes to step S1 through step S12. At this time, each of keys 6a on the keyboard 6 performs as a cursor movement key with which the cursor 13 is moved based on the relationship with (2,9).

If the succeedingly depressed key 6a is in the left side, the key in the right side is determined not to be depressed in step S20, the cursor is moved to the left by one character in step S22, and then the procedure goes to step S1 through step S12.

Then, a second embodiment of the cursor movement process will be explained with reference to FIG. 9.

Figure 8:
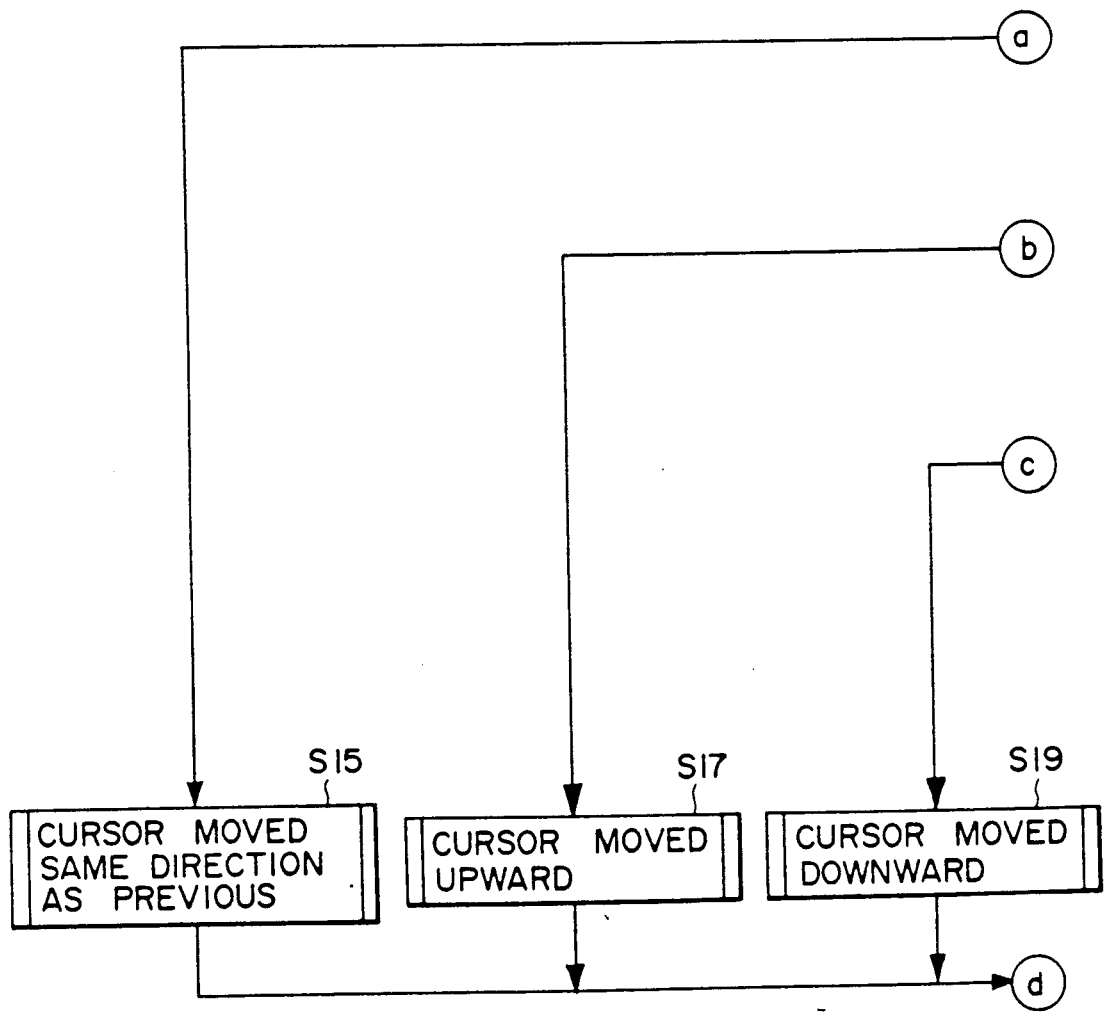

FIG. 9, as well as FIG. 8, shows the subroutine in the cursor movement mode process. In the second embodiment, however, a predetermined reference key is determined on the keyboard 6 in advance, when the cursor movement mode is set up, and the movement direction of the cursor corresponding to each of keys 6a is determined by means of the positional relationship between the depressed key and the reference key.

When the cursor movement mode is set, for instance, as is shown in FIG. 4, the key 6a which position is (3,5) is set as the reference position on the keyboard 6, and each key 6a is set up to have the function as the cursor movement key for each direction. Assuming that the key of the position (2,9) in FIG. 2 is depressed. Then, in the procedure in step S24, the operation of the depressed key (2,9) in relation to the reference key (3,5) is executed and the operation results, positive in the column direction, negative in the row direction, are stored. Then, in step S25, it is examined whether the depressde key is in underside of the reference key or not, or whether the operation result in the column direction is negative or not. If it is determined that the key in the underside is operated, the cursor 13 is moved downwardly by one line and the procedure returns to step S1. The operation result is, however, positive in the column direction, so it is determined that the depressed key is not in the underside of the reference key, and the procedure goes to step S27.

In step S27, it is examined whether the depressed key is in the right side of the reference key or not, or whether the the operation result in the column direction is positive or not. The key depressed is determined to be in the upside of the reference key, then the cursor 13 is moved upwardly by one line in step S28, and the procedure returns to step S1. In step S27, if it is determined that the key in upside is not depressed, the procedure goes to step S29. In step S29, it is examined whether the depressed key is in the right side of the reference key or not, or whether the operation result in the row direction is negative or not. If the key in the right side is determined to be depressed, the cursor 13 is moved to the right by one character in step S30, then the procedure returns to step S1. If it is determined in step S29 that the depressed key is not in the right side of the reference key, the cursor 13 is moved to the left by one character, then the procedure returns to step S1. It may be considered that a cursor move direction for the reference key is determined in advance.

Incidentally, in the second embodiment descrived above, the function of each key on the keyboard is fixed when the cursor movement mode is set, but it is possible that, as shown in FIG. 10, the function of each key is changed at the operation of the keys after the first key operation on condition that the cursor movement mode is designated.

What is claimed is:

1. A data processing device comprising input means including a plurality of key members, respectively corresponding to a code to be inputted, represent means for representing character data corresponding to the inputted codes, and designate means for designating a position at which a code to be inputted on said represent means, said data processing device further comprising:

mode change means for changing an operation mode of said data processing device between a normal input mode and at least another predetermined mode;

first examine means for examining whether said another predetermined mode is designated by said mode change means when one of said key members is operated; and control means for controlling each of said key members, in case that said another predetermined mode is designated, so as to have a predetermined relationship with said designate means in accordance with each of positional relationships between said one of said key members and each of said key members on said input means.

2. The data processing device according to claim 1 wherein said input means comprises a keyboard member on which each of said key members are arranged along a plurality of columns and rows, and wherein said represent means comprises a display and said designate means comprises a cursor represented on said display.

3. The data processing device according to claim 2 wherein said predetermined relationship is that said cursor is moved on said display in accordance with said positional relationships in case that one of said key members is depressed.

4. The data processing device according to claim 3 wherein said control means includes second examine means for examining whether said depressed key member is located on a row on which said one of said key members is located, and controls said depressed key member so as to move the cursor on said display in a corresponding longitudinal direction in case that it is determined by said second examine means that said depressed key member is not located on a row on which said one of said key members is located.

5. The data processing device according to claim 4 wherein said control means further controls said depressed key member so as to move the cursor in a corresponding transversal direction in case that it is determined by said second examine means that said depressed key member is located on a row on which said one of said key members is located.

6. The data processing device according to claim 5 which further comprises third examine means for examining whether said depressed key member is the same as said one of said key members, and wherein said control means further controls said depressed key member so as to move the cursor in a direction to which the cursor is moved by said one of said key members in case that it is determined by said third examine means that said depressed key member is the same as said one of said key members.

7. A data processing device comprising input means including a plurality of key members, respectively corresponding to a code to be inputted, represent means for representing character data corresponding to the inputted codes, and designate means for designating a position at which a code to be inputted on said represent means, said data processing device further comprising:
   mode change means for changing an operation mode of said data processing device between a normal input mode and at least an another predetermined mode;
   first examine means for examining whether said another predetermined mode is designated by said mode change means when one of said key members is operated;
   control means for controlling said one of said key members, in case that said another predetermined mode is designated, so as to have a predetermined relationship with said designate means in accordance with the positional relationship between said one of said key members and a predetermined key member on said input means.

8. The data processing device according to claim 7 wherein said input means comprises a keyboard member on which each of said key members are arranged along a plurality of columns and rows, and wherein said represent means comprises a display and said designate means comprises a cursor represented on said display.

9. The data processing device according to claim 8 wherein said predetermined relationship is that said cursor is moved on said display in accordance with said positional relationship in case that one of said key members is depressed.

10. The data processing device according to claim 9 wherein said control means includes second examine means for examining whether said one of said key member is located on a row on which said predetermined key members is located, and controls said one of said key members so as to move the cursor on said display in a corresponding longitudinal direction in case that it is determined by said second examine means that said one of said key members is not located on a row on which said predetermined key member is located.

11. The data processing device according to claim 10 wherein said control means further controls said one of said key members so as to move the cursor in a corresponding transversal direction in case that it is determined by said second examine means that said one of said key members is located on a row on which said predetermined key member is located.

12. The data processing device according to claim 11 which further comprises third examine means for examining whether said one of said key members is the same as said predetermined key member, and wherein said control means further controls said one of said key members so as to move the cursor in a predetermined direction in case that it is determined by said third examine means that said one of said key members is the same as said predetermined key member.

13. A data processing device comprising input means including a plurality of key members, respectively corresponding to a code to be inputted, represent means for representing character data corresponding to the inputted codes, and designate means for designating a position at which a code to be inputted on said represent means, said data processing device further comprising:
   mode change means for changing an operation mode of said data processing device between normal input mode and at least an another predetermined mode;
   first examine means for examining whether said another predetermined mode is designated by said mode change means when one of said key members is operated;
   second examine means for examining whether an input operation has been previously executed by means of one of said key members in case that it is determined by said first examine means that said another predetermined mode is designated;
   first control means for controlling said designate means so as to be moved in a predetermined direction based upon a positional relationship between said one of said key members and a predetermined key member on said input means in case that it is determined by said second examine means that an input operation has not been previously executed;
   memory means for storing positional data of said one of said key members; and
   second control means for controlling each of said key members so as to have a predetermined relationship with said designate means in accordance with each of positional relationships between the positional data stored in said memory means and each of said key members on said input means in case that it is determined by said second examine means that an input operation has been previously executed.

14. The data processing device according to claim 13 wherein said input means comprises a keyboard member on which each of said key members are arranged along a plurality of columns and rows, and wherein said represent means comprises a display and said designate means comprises a cursor represented on said display.

15. The data processing device according to claim 14 wherein said predetermined relationship is that said cursor is moved on said display in accordance with said positional relationships in case that one of said key members is depressed.

16. The data processing device according to claim 15 wherein said second control means includes third examine means for examining whether said depressed key member is located on a row on which said one of said key members is located, and controls said depressed key member so as to move the cursor on said display in a corresponding longitudinal direction in case that it is determined by said third examine means that said depressed key member is not located on a row on which said one of said key members is located.

17. The data processing device according to claim 16 wherein said second control means further controls said depressed key member so as to move the cursor in a corresponding transversal direction in case that it is determined by said third examine means that said depressed key member is located on a row on which said one of said key members is located.

18. The data processing device according to claim 15 whetrein said predetermined direction is a transversal direction in case that said one of said key members and said predetermined key member are located on the same column, while a longitudinal direction in case that said one of said key members is not located on a column on which said predetermined key member is located.

19. The data processing device according to claim 18 wherein said first control means further comprises fourth examine means for examining whether said one of said key members is the same as said predetermined key member, and further controls said one of said key members so as to move the cursor in an another predetermined direction in case that it is determined by said fourth examine means that said one of said key members is the same as said predetermined key member.

20. The data processing device according to claim 19 wherein said second control means further comprises fifth examine means for examining whether said depressed key member is the same as said one of said key members, and further controls said depressed key member so as to move the cursor in a direction to which the cursor is moved by said one of said key members in case that it is determined by said fifth examine means that said depressed key member is the same as said one of said key members.

* * * * *